United States Patent
Herring, II et al.

(10) Patent No.: US 9,955,669 B2
(45) Date of Patent: *May 1, 2018

(54) DEVICES AND SYSTEMS FOR REDUCING SPRAY FROM NIPPLE WATER VALVES, AND RELATED METHODS

(71) Applicant: Hog Slat, Inc., Newton Grove, NC (US)

(72) Inventors: William Thomas Herring, II, Newton Grove, NC (US); Timothy Glenn King, Coats, NC (US)

(73) Assignee: HOG SLAT INC., Newton Grove, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/484,568

(22) Filed: Apr. 11, 2017

(65) Prior Publication Data
US 2017/0215376 A1    Aug. 3, 2017

Related U.S. Application Data

(62) Division of application No. 14/212,035, filed on Mar. 14, 2014, now Pat. No. 9,615,541.

(60) Provisional application No. 61/794,683, filed on Mar. 15, 2013.

(51) Int. Cl.
*A01K 7/06* (2006.01)
*A01K 7/00* (2006.01)
*B05B 1/26* (2006.01)

(52) U.S. Cl.
CPC .............. *A01K 7/06* (2013.01); *B05B 1/267* (2013.01)

(58) Field of Classification Search
USPC ...... 119/72, 72.5, 73, 74, 75, 76, 77, 78, 79, 119/80, 81; 251/339, 298, 303
See application file for complete search history.

(56) References Cited

U.S. PATENT DOCUMENTS

| | | | |
|---|---|---|---|
| 4,014,365 | A | 3/1977 | Peterson et al. |
| 4,338,884 | A | 7/1982 | Atchley et al. |
| 4,370,948 | A | 2/1983 | Atkins |
| 4,403,570 | A | 9/1983 | Freehafer |
| 4,406,253 | A | 9/1983 | Atchley et al. |
| 5,003,927 | A | 4/1991 | Thompson |
| 5,373,811 | A | 12/1994 | Wastell |
| 9,615,541 | B2 | 4/2017 | Herring, II et al. |
| 2014/0261205 | A1 | 9/2014 | Herring, II et al. |

OTHER PUBLICATIONS

Non-Final Office Action for U.S. Appl. No. 14/212,035, dated Aug. 1, 2016, 9 pages.
Non-Final Office Action for U.S. Appl. No. 14/212,035, dated Jun. 28, 2016, 10 pages.

*Primary Examiner* — Trinh T Nguyen
(74) *Attorney, Agent, or Firm* — Withrow & Terranova, PLLC

(57) ABSTRACT

According to an exemplary embodiment, an improved nipple water valve includes a nipple housing, a deflector, an annular seal, a nipple stem, a resilient element, and an orifice housing portion, assembled such that the deflector deflects water exiting the valve toward an internal surface of the nipple housing, thereby reducing spray. The deflector is also arranged to restrain movement of the nipple stem in a direction toward the deflector and to permit movement of the nipple stem away from the deflector to aid operation of the nipple water valve.

22 Claims, 6 Drawing Sheets

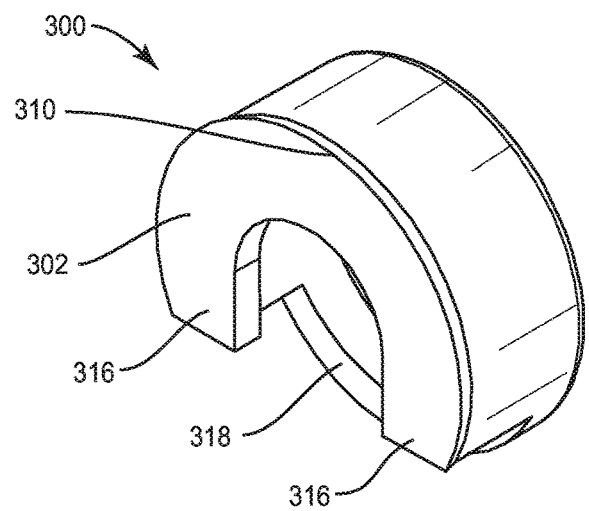
FIG. 3A
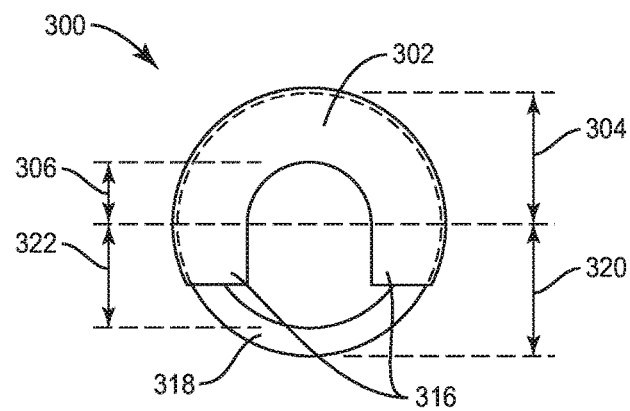
FIG. 3B
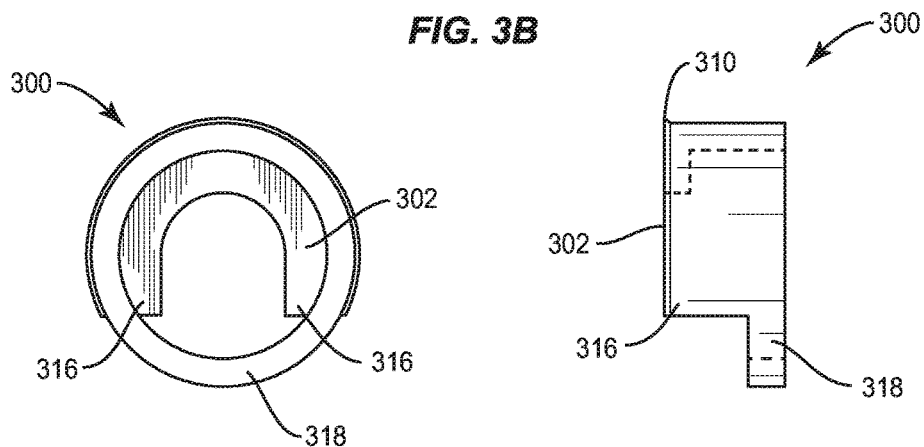
FIG. 3C  FIG. 3D

DEVICES AND SYSTEMS FOR REDUCING SPRAY FROM NIPPLE WATER VALVES, AND RELATED METHODS

PRIORITY APPLICATION

This application is a divisional of co-pending U.S. patent application Ser. No. 14/212,035, filed on Mar. 14, 2014, entitled "Devices And Systems For Reducing Spray From Nipple Water Valves, And Related Methods," which claims the benefit of U.S. Provisional Application No. 61/794,683 entitled "Devices And Systems For Reducing Spray From Nipple Water Valves, And Related Methods," filed on Mar. 15, 2013, the disclosures of each of which are incorporated herein by reference in their entireties.

FIELD OF DISCLOSURE

The technology of this disclosure relates to reducing spray from nipple water valves when operated in a livestock environment.

BACKGROUND

Nipple water valves are an effective and efficient tool for watering large quantities of livestock, for example in a large farm setting. A nipple water valve, also commonly referred to as a nipple water or a bite valve, has a threaded connection that mates with an outlet for a water source. In a neutral position, the nipple water valve maintains a watertight seal that prevents water from escaping the valve. When an animal bites on a nipple stem that extends through a housing of the nipple water valve, a seal releases water through the valve allowing the animal to drink.

Water spray is a serious problem in farming applications. Water valves are often in close proximity to feed troughs and other items that can be damaged or destroyed from excess water exposure. In addition, many animals, such as pigs and hogs, are intelligent enough to discover that water spray is a cooling agent, particularly in a hot environment such as an industrial barn. Thus, a hog or other animal may continuously bite down on a conventional nipple water valve to create a cooling spray, thereby wasting gallons of water, and destroying its feed and bedding in the process. Accordingly, there exists a need for an improved nipple water valve that reduces water spray, while retaining previous improvements over the prior art.

SUMMARY OF THE DETAILED DESCRIPTION

Devices and systems for reducing spray from nipple water valves and related methods are disclosed herein. According to an exemplary embodiment, an improved nipple water valve includes a nipple housing, a deflector, an annular seal, a nipple stem, a resilient element, and an orifice housing portion, assembled such that the deflector deflects water exiting the valve toward an internal surface of the nipple housing, thereby reducing spray. The deflector is also arranged to restrain movement of the nipple stem in a direction toward the deflector and to permit movement of the nipple stem away from the deflector to aid operation of the nipple water valve.

According to an exemplary embodiment, a deflector for a nipple water valve for watering livestock is disclosed. The deflector is adapted to be mounted in a nipple housing. The nipple housing is adapted to receive a nipple stem therethrough. The deflector is adapted to deflect water toward an internal surface of the nipple housing. The deflector is also adapted to permit movement of the nipple stem into contact with the internal surface of the nipple housing in a direction away from a main body of the deflector. The deflector is further adapted to prevent movement of the nipple stem into contact with the internal surface of the nipple housing in a direction toward the main body when the deflector is mounted in the nipple housing.

According to another exemplary embodiment, a nipple water valve for watering livestock is provided. The nipple water valve comprises a nipple housing having an inlet, an outlet, and a cylindrical inner surface. The nipple water valve also comprises a nipple stem mounted in the nipple housing such that an end of the nipple stem extends through the nipple housing toward the outlet and is movable toward the cylindrical inner surface of the nipple housing. The nipple water valve further comprises a deflector having a main body mounted in the nipple housing such that the main body permits the nipple stem to be moved into contact with an internal surface of the nipple housing in a direction away from the main body. The deflector also prevents the nipple stem from being moved into contact with the internal surface of the nipple housing in a direction toward the main body.

According to another exemplary embodiment, a nipple water valve kit is provided. The nipple water valve kit comprises a nipple housing having an inlet, an outlet, and a cylindrical inner surface. The nipple water valve kit further comprises a nipple stem configured to be mounted in the nipple housing such that an end of the nipple stem extends through the nipple housing toward the outlet and is movable toward the cylindrical inner surface of the nipple housing. The nipple water valve kit further comprises a deflector configured to be mounted on the cylindrical inner surface of the nipple housing such that a main body permits the end of the nipple stem to be moved into contact with an internal surface of the nipple housing in a direction away from the main body. The deflector also prevents the end of the nipple stem from being moved into contact with the internal surface of the nipple housing in a direction toward the semi-annular portion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 3A illustrates an isometric view of the deflector shown with respect to the alternative nipple water valve of FIG. 2A that includes water flow and spray from an outlet from absence of a deflector;

FIG. 3B illustrates a front view of the deflector of FIG. 3A;

FIG. 3C illustrates a rear view of the deflector of FIG. 3A;

FIG. 3D illustrates a side view of the deflector of FIG. 3A;

DETAILED DESCRIPTION

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Devices and systems for reducing spray from nipple water valves and related methods are disclosed herein. According to an exemplary embodiment, an improved nipple water valve includes a nipple housing, a deflector, an annular seal, a nipple stem, a resilient element, and an orifice housing portion, assembled such that the deflector deflects water exiting the valve toward an internal surface of the nipple housing, thereby reducing spray. The deflector is also arranged to restrain movement of the nipple stem in a direction toward the deflector and to permit movement of the nipple stem away from the deflector to aid operation of the nipple water valve.

Figure 1A:
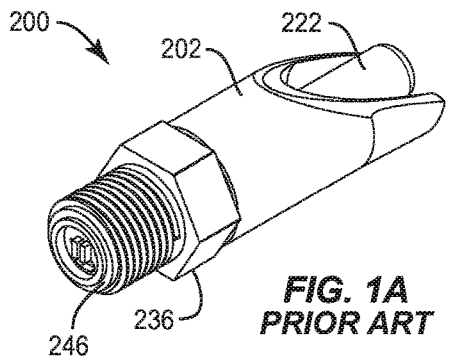
FIG. 1A illustrates an isometric view of a conventional nipple water valve according to the prior art.
Figure 1B:
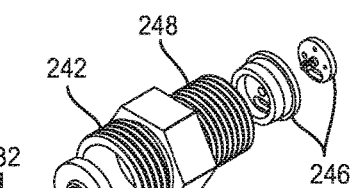
FIG. 1B illustrates an isometric exploded view of the conventional nipple water valve of FIG. 1A.
Figure 1B:
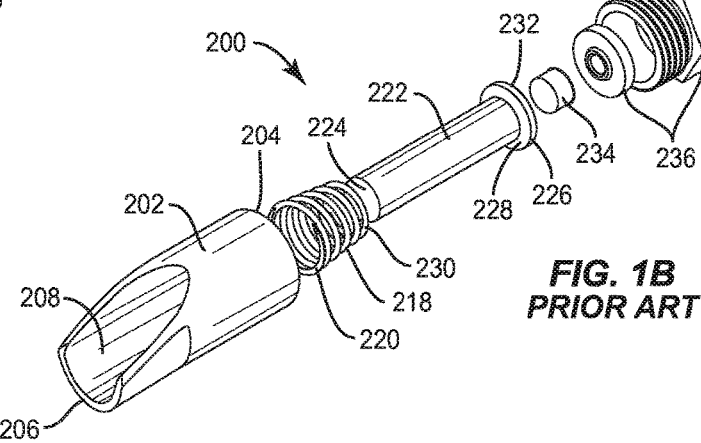
Figure 1C:
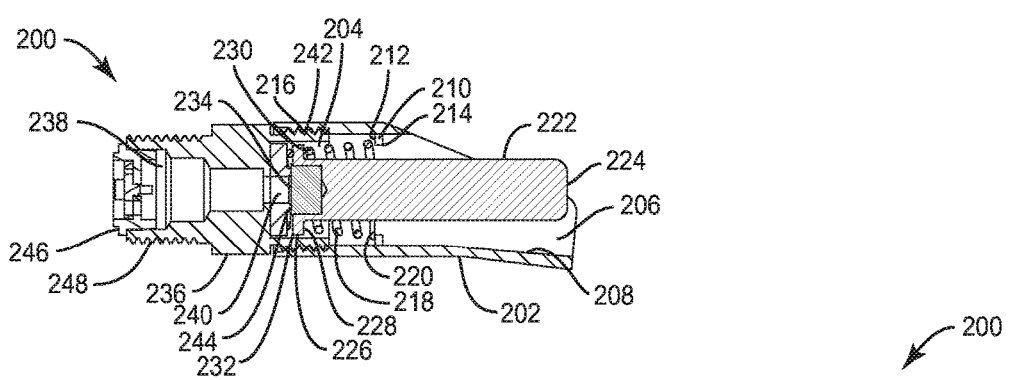
FIG. 1C illustrates a side cutaway view of the conventional nipple water valve of FIG. 1A.

FIGS. 1A-1C illustrate a perspective isometric view, exploded view, and side cutaway view of a conventional nipple water valve 200. A nipple housing 202 of the conventional nipple water valve 200 has an inlet 204, an outlet 206, and a substantially cylindrical inner surface 208. An annular flange 210 having an inlet-facing seat 212 is formed on the cylindrical inner surface 208, and an inlet-facing threaded portion 216 is located at the inlet 204 of the nipple housing 202. A spring 218 or other resilient element is disposed in the nipple housing 202 with an outlet-facing end 220 abutting the inlet-facing seat 212 of the annular flange 210. A nipple stem 222 is disposed through the spring 218 such that a distal end 224 of the nipple stem 222 partially extends from the outlet 206 of the nipple housing 202. The nipple stem 222 includes an annular flange 226 with an outlet-facing seat 228 that abuts an inlet-facing end 230 of the spring 218, and an inlet-facing seat 232 that carries a rubber seal 234.

An intermediate portion 236 having an inlet 238 and an outlet 240 is connected to the inlet-facing threaded portion 216 of the nipple housing 202 via an outlet-facing threaded portion 242 of the intermediate portion 236. An outlet-facing seat 244 of the intermediate portion 236 abuts the rubber seal 234 and forms a watertight seal between the rubber seal 234 and the outlet 240 of the intermediate portion 236. When the distal end 224 of the nipple stem 222 is moved in any direction toward the cylindrical inner surface 208 of the nipple housing 202, however, an opening is created between the rubber seal 234 and the outlet 240 of the intermediate portion 236, thereby allowing water to flow freely out of the outlet 206 of the nipple water valve 200. When the nipple stem 222 is released, the spring 218 biases the annular flange 226 back towards the outlet 240 of the intermediate portion 236, thereby reforming the watertight seal. The intermediate portion 236 has a restrictor 246 connected to the inlet 238 to regulate incoming water flow, and has an inlet-facing threaded portion 248 for mating with a standard hose, faucet or other plumbing connection (not shown).

Figure 1D:
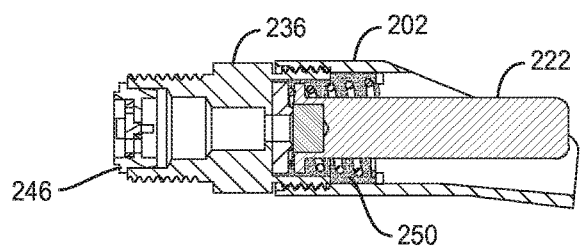
FIG. 1D illustrates a side cutaway view of the conventional nipple water valve of FIG. 1A that includes debris blocking a spring and an outlet.

The conventional nipple water valve 200 of FIGS. 1A-1C has a number of limitations that add to the cost and complexity of the device. For example, this design requires a specialized spring 218, which has a tapering radius between the outlet-facing end 220 and the inlet-facing end 230 to allow the nipple stem 222 to move freely and permit the nipple water valve 200 to be activated. The number of machined parts required to produce this conventional nipple water valve 200 also increases the cost of the valve. In addition, the spring 218 is located downstream of the watertight seal between the rubber seal 234 and the outlet 240 of the intermediate portion 236. As shown in an alternate side cutaway view of FIG. 1D, this location makes the spring 218 more susceptible to wear, corrosion, jamming, and/or the introduction of dirt and biological matter 250 that can clog the spring 218 and/or outlet 206.

Figure 2A:
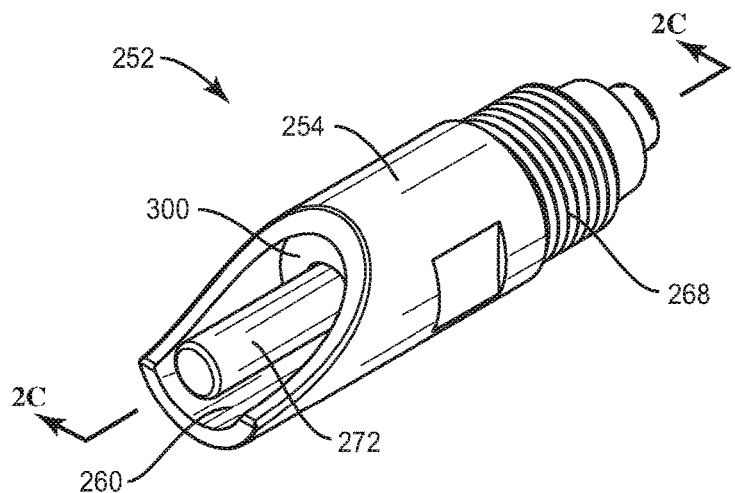
FIG. 2A illustrates an isometric view of an alternative nipple water valve according to an embodiment.
Figure 2B:
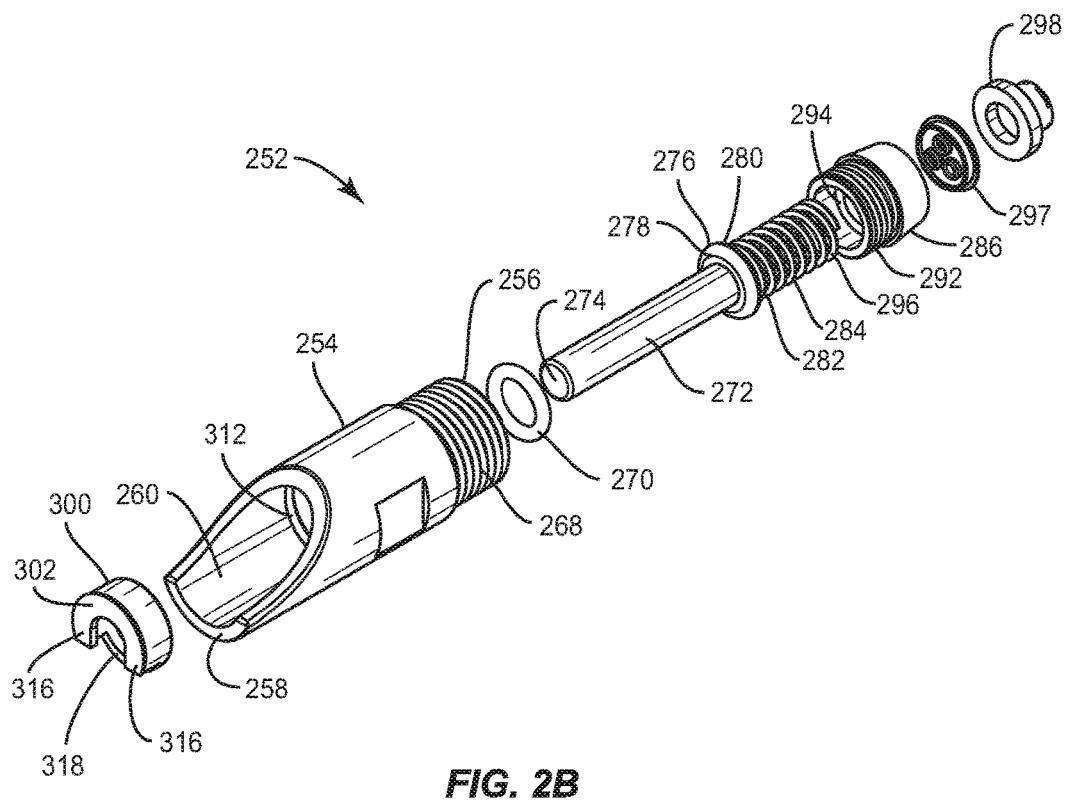
FIG. 2B illustrates an isometric exploded view of the alternative nipple water valve of FIG. 2A.
Figure 2C:
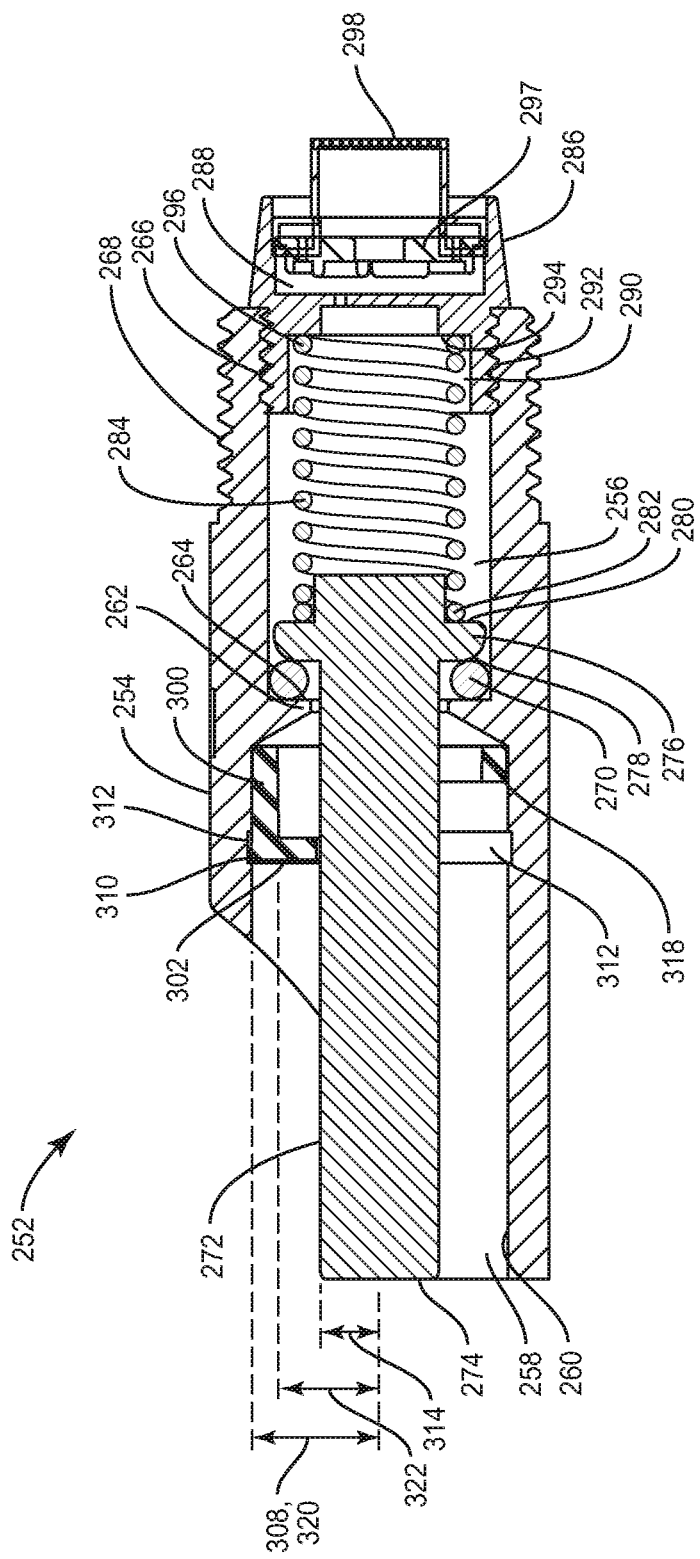
FIG. 2C illustrates a side cutaway view of the alternative nipple water valve of FIG. 2A.

To overcome the drawbacks of the conventional nipple water valve 200 of FIGS. 1A-1D, an alternative nipple water valve 252 has been developed. FIGS. 2A-2C illustrate a respective isometric view, exploded view, and side cutaway view of the alternative nipple water valve 252. A nipple housing 254 of the alternative nipple water valve 252 has an inlet 256, an outlet 258 and a substantially cylindrical inner surface 260. An annular flange 262 having an inlet-facing seat 264 is formed on the cylindrical inner surface 260. An inlet-facing inner threaded portion 266 and an inlet-facing outer threaded portion 268 are also located at the inlet 256 of the nipple housing 254. Unlike the conventional nipple water valve 200 of FIGS. 1A-1D, however, an annular seal 270, such as a rubber O-ring, is disposed against the inlet-facing seat 264 of the annular flange 262. A nipple stem 272 is disposed through the annular seal 270 such that a distal end 274 of the nipple stem 272 partially extends from the outlet 258 of the nipple housing 254. The nipple stem 272 includes an annular flange 276 with an outlet-facing seat 278 that abuts the annular seal 270 and an inlet-facing seat 280 that abuts an outlet-facing end 282 of resilient element 284 (i.e., a spring). In an alternative embodiment, the spring 284 could be replaced with another resilient or spring-like element, such as a silicone insert.

The alternative nipple water valve 252 includes an orifice housing portion 286 having an inlet 288 and an outlet 290 connected to the inlet-facing inner threaded portion 266 of the nipple housing 254 via an outlet-facing threaded portion 292 of the orifice housing portion 286. An outlet-facing seat 294 of the orifice housing portion 286 abuts an inlet-facing end 296 of the spring 284. When the distal end 274 of the nipple stem 272 is moved in any direction toward the cylindrical inner surface 260 of the nipple housing 254, an opening is created between the annular seal 270 and the outlet-facing seat 278 of the nipple stem 272, allowing water to flow freely out of the outlet 258 of the alternative nipple water valve 252. When the nipple stem 272 is released, the spring 284 biases the annular flange 262 back towards the annular seal 270, thereby reforming the watertight seal. The orifice housing portion 286 includes a restrictor orifice plate 297 connected at the inlet 256 to regulate incoming water flow, and also includes a filter screen 298 disposed across the inlet 256 to filter out solid debris in the water supply. The orifice housing portion 286 is configured such that mounting of the orifice housing portion 286 to the nipple housing 254 via the inlet-facing inner threaded portion 266 does not interfere with the attachment of a standard hose, faucet, or other plumbing connection (not shown) to the inlet-facing outer threaded portion 268 of the nipple housing 254.

The alternative nipple water valve 252 has a number of advantages over the conventional nipple water valve 200 of FIGS. 1A-1D. For example, the alternative nipple water valve 252 contains fewer parts and has a simplified mechanism that reduces manufacturing cost. For example, the alternative nipple water valve 252 includes a "rear-spring" design that disposes the spring 284 upstream of the nipple stem 272. The spring 284 therefore does not need to accommodate movement of the distal end 274 of the nipple stem 272 within the nipple housing 254. As a result, a standard, straight spring 284 can be used in place of a more specialized tapered spring, such as the spring 218 of the conventional nipple water valve 200 of FIGS. 1A-1D. Unlike the spring 218 of the conventional nipple water valve 200, which has a tapering radius to accommodate movement of the distal end 224 of the nipple stem 272, the spring 284 of the alternative nipple water valve 252 has a constant radius, which reduces manufacturing costs by allowing for use of less expensive, simpler, and more standardized springs, such as the spring 284. This design also reduces cleaning and maintenance costs because the spring 284 is not as exposed as the spring 218 of the conventional nipple water valve 200. Because the spring 284 of the alternative nipple water valve 252 is located behind the watertight seal, the spring 284 is less susceptible to clogging with dirt and biological matter, such as the dirt and biological matter 250 of FIG. 1D.

In addition, the alternative nipple water valve 252 includes a deflector 300 mounted in the outlet 258 of the nipple housing 254. The deflector 300 is arranged to deflect water exiting the nipple water valve 252 by reducing the flow of water in a direction of a longitudinal axis of the nipple housing 254 and directing water toward the cylindrical inner surface 260 of the nipple housing 254, thereby reducing spray.

Spray is a serious issue in many livestock watering applications. For example, water within a typical water line can be provided at forty pounds per square inch (40 psi) such that, when a nipple water valve is opened, such as the conventional nipple water valve 200 of FIGS. 1A-1D, water rushes out through the opening unevenly. This is because the opening between a nipple stem and a nipple housing of a nipple water valve, such as the nipple water valve 200 or 252, creates a narrow, non-uniformly shaped passage that creates a highly turbulent flow out of the nipple water valve. As will be described in greater detail with respect to FIGS. 3A-3D, this passage can cause water to spray in all directions when a nipple water valve is opened.

Therefore, the deflector 300 having a main body 302 is provided to deflect water exiting the outlet 258 of the nipple water valve 252, thereby reducing spray. The deflector 300 is configured to permit movement of the nipple stem 272 such that the distal end 274 can be moved into contact with the cylindrical inner surface 260 of the nipple housing 254 in a direction away from the main body 302 of the deflector 300. Thus, the deflector 300 does not interfere with the release of water from the nipple water valve 252, for example when an animal bites down on the nipple stem 272 and the nipple housing 254.

In some embodiments, the deflector 300 may be arranged to prevent movement of the nipple stem 272 toward the cylindrical inner surface 260 of the nipple housing 254 in a direction toward the main body 302 of the deflector 300. This feature helps prevent foreign material that may become jammed between an end of the nipple stem 272 and the nipple housing 254 from pushing the nipple stem 272 upward, thereby preventing water loss. FIGS. 3A-3D illustrate a respective isometric view, front view, rear view, and side cutaway view of the deflector 300 according to the embodiment of FIGS. 2A-2C. It should be understood that, in FIGS. 3A-3D and elsewhere herein, like elements are referred to using like reference numbers.

In the embodiment of FIGS. 2A-2C and 3A-3D, the main body 302 of the deflector 300 has a semi-annular shape having an external radius 304 and an internal radius 306. In this embodiment, the external radius 304 is substantially the same as the internal radius 308 of the nipple housing 254 (shown in FIG. 2C). Thus, in some embodiments, the deflector 300 may be held in place in the nipple housing 254 by a friction fit. In this embodiment, the deflector 300 includes an annular protrusion 310 for releasably mating with an annular indentation 312 in the nipple housing 254, thereby securing the deflector 300 in the nipple housing 254. In another embodiment, a plurality of annular protrusions 310 may mate with one or more annular indentations 312 in the nipple housing 254, or vice versa. In other embodiments, the deflector 300 may be held in place by adhesive, fasteners, or other methods (not shown). The deflector may also be permanently attached to the cylindrical inner surface 260 of the nipple housing 254, such as by welding, or may be integrally formed with the cylindrical inner surface 260 of the nipple housing 254, such as by molding or machining. The deflector 300 may be formed from a variety of materials, such as nylon, thermoplastic, brass, stainless steel, or other plastics, non-corrosive metals, or other suitable materials.

In the embodiment of FIGS. 2A-2C and 3A-3D, the internal radius 306 of the main body 302 is substantially equal to a cross sectional radius 314 of the nipple stem 272. In this embodiment, the main body 302 extends one hundred eighty degrees (180°) around the top of the nipple stem 272, thereby preventing movement of the nipple stem 272 in any upward direction toward the cylindrical inner surface 260 of the nipple housing 254. In other embodiments, depending on the extent to which the main body 302 extends around the nipple stem 272, the deflector 300 may restrain movement of the nipple stem 272 to a lesser extent.

In this embodiment, the deflector 300 further includes guide portions 316 that extend downward from the main body 302 of the deflector 300. The guide portions 316 are arranged to further restrain horizontal movement of the nipple stem 272, such that the nipple stem 272 is effectively movable only in a downward direction. In addition, the guide portions 316 aid the main body 302 in deflecting water toward the bottom of the cylindrical inner surface 260 of the nipple housing 254, thereby further reducing spray. In this embodiment, the guide portions 316 are coplanar with the main body 302 and are also integrally formed with the main body 302.

The deflector 300 also includes an annular portion 318 along a longitudinal axis of the deflector 300. The annular portion 318 has an external radius 320 that is the same as the external radius 304 of the main body 302 and the internal radius 308 of the nipple housing 254. The annular portion 318 also has an internal radius 322 that is larger than the internal radius 306 of the main body 302, thereby permitting the distal end 274 of the nipple stem 272 to be moved into contact with the cylindrical inner surface 260 of the nipple housing 254 without contacting or otherwise interfering with the annular portion 318.

Figure 4A:
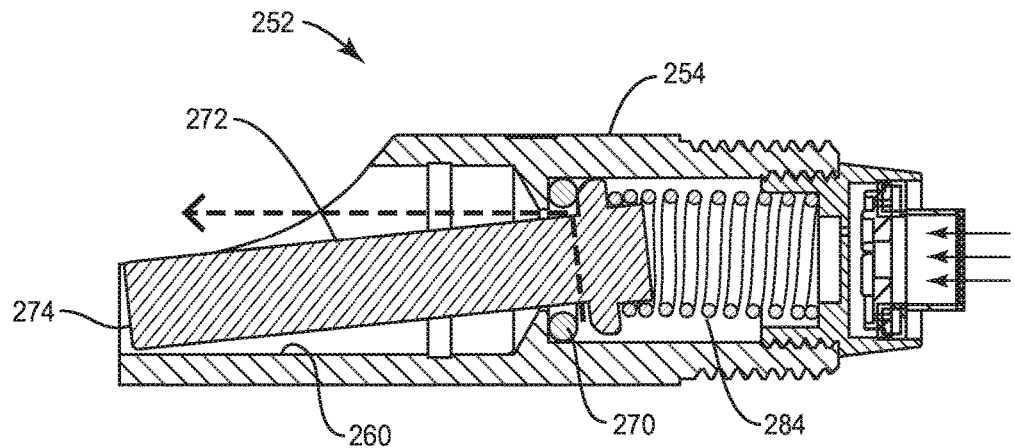
FIG. 4A illustrates a side cutaway view of the operation of the nipple water valve of FIGS. 2A-2C with a deflector removed, showing the water flow and spray from the outlet.
Figure 4B:
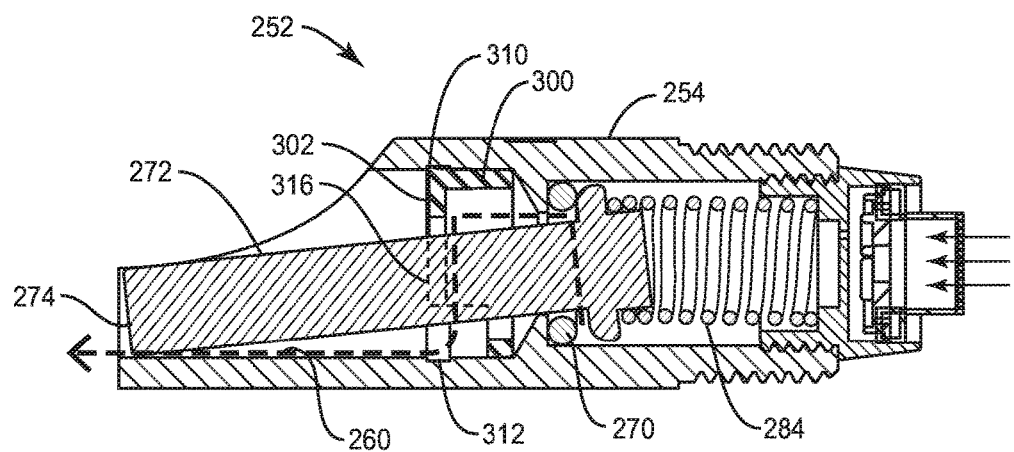
FIG. 4B illustrates a side cutaway view of the operation of the nipple water valve of FIGS. 2A-2C with a deflector in place, showing the water flow and deflection of spray from the outlet by the deflector.

A comparison of the operation of the alternative nipple water valve 252 with and without the deflector 300 is illustrated in FIGS. 4A and 4B. FIG. 4A illustrates a side cutaway view of the operation of the nipple water valve 252 of FIGS. 2A-2C with the deflector 300 removed. As can be seen in FIG. 4A, when the nipple stem 272 is pressed toward the cylindrical inner surface 260 of the nipple housing 254, water flows out the opening created by the nipple stem 272 at the bottom of O-ring 270. Water flows around the nipple stem 272 and over the top of the nipple stem 272 where another opening has been created between the nipple stem 272 and the O-Ring 270 and nipple housing 254. This operation causes water to be sprayed from the nipple water valve 252 at high pressure from the top of the nipple stem 272 and out of the open upper end of the nipple housing 254.

FIG. 4B illustrates a side cutaway view of the operation of the nipple water valve 252 of FIGS. 2A-2C with the deflector 300 in place. As can be seen in FIG. 4B, the high velocity spray from the top of the nipple stem 272 is slowed and blocked by the deflector 300, which allows more water to flow back down around the nipple stem 272 by force of gravity at a reduced speed and pressure. In this manner, the deflector 300 prevents from spraying out of an open upper end of the nipple housing 254 by the main body 302 of the deflector 300 without otherwise impeding the rate of flow of water from the nipple water valve 252. Thus, it can be seen that the inclusion of the deflector 300 can significantly reduce spray from the nipple water valve 252.

Figure 5A:
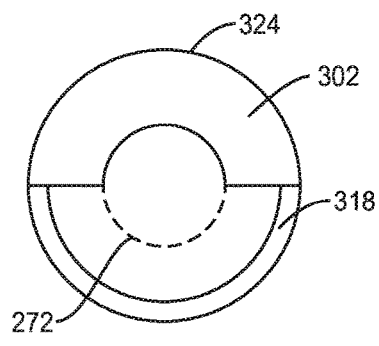
FIG. 5A illustrates a front view of a deflector according to an alternate embodiment.
Figure 5B:
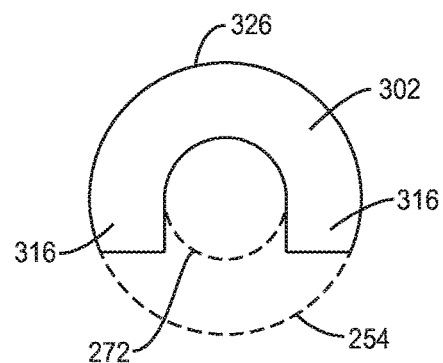
FIG. 5B illustrates a front view of a deflector according to an alternate embodiment.

FIGS. 5A-5D illustrate alternative embodiments of different deflectors that can be used as substitutes for the deflector 300 of FIGS. 2A-2C and 3A-3D. FIG. 5A illustrates a deflector portion 324 having the semi-annular main body 302 of deflector 300 of FIGS. 3A-3D, and an annular portion 318 only, according to an exemplary embodiment. In this embodiment, cost savings may be achieved by omitting guide portions 316 so that less material is used. FIG. 5B illustrates an alternate deflector 326 having a semi-annular main body 302 and guide portions 316 only, according to an exemplary embodiment. A similar annular protrusion 310 may hold this deflector 326 in place within the recess 312 of nipple housing 254 (not shown). Similar to the embodiment of FIG. 5A, cost savings may be achieved by using less material when manufacturing the deflector 326.

Figure 5C:
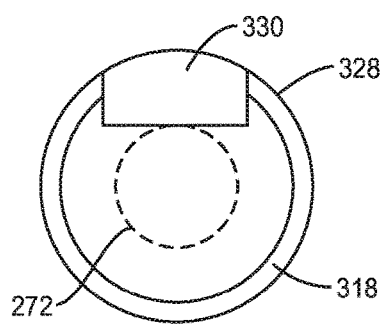
FIG. 5C illustrates a front view of a deflector according to an alternate embodiment.

FIG. 5C illustrates a deflector 328 having a non-semi-annular main body 330 according to an exemplary embodiment. In this embodiment, the deflector 328 includes a straight, flat shape, which is arranged to restrain vertical movement of the nipple stem (such as the nipple stem 272 of FIGS. 3A-3D) and to reduce spray emitted by the nipple housing (such as the nipple housing 254) when the nipple water valve is activated, such as the nipple water valve 252 of FIGS. 2A-2C and 3A-3D.

Figure 5D:
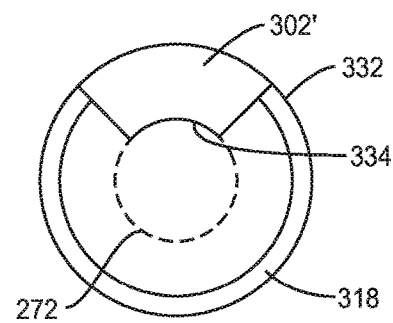
FIG. 5D illustrates a front view of a deflector according to an alternate embodiment.

FIG. 5D illustrates a deflector 332 having a semi-annular main body 302' that extends through ninety degrees (90°). In this embodiment, an internal surface 334 of the semi-annular main body 302' acts as a seat into which the spring biases the nipple stem (such as the spring 284 and the nipple stem 272 of FIGS. 3A-3D) into the internal surface 334 of the semi-annular main body 302' without overly restraining horizontal movement of the nipple stem within the nipple housing (such as the nipple stem 272 and the nipple housing 254 of FIGS. 3A-3D).

Those skilled in the art will recognize improvements and modifications to the preferred embodiments of the present disclosure. All such improvements and modifications are considered within the scope of the concepts disclosed herein and the claims that follow.

We claim:

1. A deflector for a nipple water valve for watering livestock, the deflector comprising:
    a main body adapted to be mounted in a nipple housing, the nipple housing being adapted to receive a nipple stem therethrough, the main body including a semi-annular portion and an annular portion connected to the semi-annular portion, the annular portion being adapted to be mounted in the nipple housing and to receive the nipple stem therethrough;
    wherein the main body is adapted to:
    deflect water toward an internal surface of the nipple housing;
    permit movement of the nipple stem into contact with the internal surface of the nipple housing in a direction away from the main body; and
    prevent movement of the nipple stem into contact with the internal surface of the nipple housing in a direction toward the main body when the deflector is mounted in the nipple housing;
    wherein:
    the semi-annular portion has a first external radius about a longitudinal axis of the nipple water valve substantially equal to an internal radius of the nipple housing about the longitudinal axis;
    the semi-annular portion has a first internal radius about the longitudinal axis substantially equal to an external radius of the nipple stem about the longitudinal axis, such that the semi-annular portion permits movement of the nipple stem into contact with the internal surface of a nipple housing outlet in a direction away from the semi-annular portion, and prevents movement of the nipple stem into contact with the internal surface of the nipple housing outlet in a direction toward the semi-annular portion when the deflector is mounted in the nipple housing;
    the annular portion has a first external radius about the longitudinal axis substantially equal to the internal radius of the nipple housing; and
    the annular portion has a first internal radius about the longitudinal axis larger than the first external radius of the nipple stem.

2. The deflector of claim 1, wherein the annular portion does not prevent movement of the nipple stem into contact with the internal surface of the nipple housing when the deflector is mounted in the nipple housing.

3. The deflector of claim 1, wherein the semi-annular portion restrains flow of the water from the nipple housing in the direction of the longitudinal axis.

4. The deflector of claim 1, wherein the semi-annular portion is unitary with the nipple housing.

5. The deflector of claim 1, wherein the semi-annular portion extends through approximately 90 degrees.

6. The deflector of claim 1, further comprising guide portions connected to the semi-annular portion for restraining lateral movement of the nipple stem.

7. The deflector of claim 6, wherein the guide portions are unitary with the semi-annular portion.

8. The deflector of claim 6, wherein the guide portions are coplanar with the semi-annular portion.

9. The deflector of claim 6, wherein the guide portions permit movement of the nipple stem into contact with the internal surface of the nipple housing in at least one direction.

10. The deflector of claim 1, wherein the deflector is composed of plastic.

11. The deflector of claim 1, wherein the deflector is composed of non-corrosive metal.

12. The deflector of claim 1, wherein the deflector is composed of a material selected from the group consisting of: nylon; thermoplastic; stainless steel; and brass.

13. The deflector of claim 1, wherein the deflector is sized to form a friction fit in the nipple housing.

14. The deflector of claim 1, wherein the deflector includes at least one protrusion for mating with one or more corresponding indentations in the nipple housing.

15. The deflector of claim 1, wherein the deflector includes at least one indentation for mating with one or more corresponding protrusions in the nipple housing.

16. The deflector of claim 1, wherein the main body further comprises:
   a first guide portion having a first internal surface extending downward from the semi-annular portion; and
   a second guide portion having a second internal surface substantially parallel to the first internal surface of the first guide portion, the second internal surface extending downward from the semi-annular portion;
   wherein the first guide portion and the second guide portion of the main body form a vertical channel having a constant width substantially equal to twice a second internal radius of the semi-annular portion, such that horizontal movement of the nipple stem is restrained.

17. A deflector for a nipple water valve for watering livestock, the deflector comprising:
   a main body adapted to be mounted in a nipple housing, the nipple housing being adapted to receive a nipple stem therethrough, the main body comprising:
      a semi-annular portion having a first external radius about a longitudinal axis of the nipple water valve substantially equal to an internal radius of the nipple housing about the longitudinal axis, and a first internal radius about the longitudinal axis substantially equal to an external radius of the nipple stem about the longitudinal axis; and
      an annular portion connected to the semi-annular portion, the annular portion being adapted to be mounted in the nipple housing and to receive the nipple stem therethrough, the annular portion has a first external radius about the longitudinal axis substantially equal to the internal radius of the nipple housing, and the first internal radius about the longitudinal axis larger than the first external radius of the nipple stem;
      a first guide portion having a first internal surface extending downward from the semi-annular portion; and
      a second guide portion having a second internal surface substantially parallel to the first internal surface of the first guide portion, the second internal surface extending downward from the semi-annular portion;
   wherein the semi-annular portion permits movement of the nipple stem into contact with an internal surface of a nipple housing outlet in a direction away from the semi-annular portion, and prevents movement of the nipple stem into contact with the internal surface of the nipple housing outlet in a direction toward the semi-annular portion when the deflector is mounted in the nipple housing; and
   wherein the first guide portion and the second guide portion of the main body form a vertical channel having a constant width substantially equal to twice a second internal radius of the semi-annular portion, such that horizontal movement of the nipple stem is restrained.

18. The deflector of claim 17, wherein the annular portion does not prevent movement of the nipple stem into contact with the internal surface of the nipple housing when the deflector is mounted in the nipple housing.

19. The deflector of claim 17, wherein the semi-annular portion is unitary with the nipple housing.

20. The deflector of claim 17, wherein the semi-annular portion extends through approximately 90 degrees.

21. The deflector of claim 17, wherein the deflector is sized to form a friction fit in the nipple housing.

22. The deflector of claim 17, wherein the deflector includes at least one protrusion for mating with one or more corresponding indentations in the nipple housing.

* * * * *